United States Patent
Peinelt et al.

(10) Patent No.: US 10,335,835 B2
(45) Date of Patent: Jul. 2, 2019

(54) METHOD FOR CLEANING A FASTENING SURFACE FOR A BALANCING ELEMENT ON A VEHICLE WHEEL

(71) Applicant: Schenck RoTec GmbH, Darmstadt (DE)

(72) Inventors: Andreas Peinelt, Pfungstadt (DE); Jonas Zech, Niederkirchen (DE)

(73) Assignee: Schenck RoTec GmbH, Darmstadt (DE)

( * ) Notice: Subject to any disclaimer, the term of this patent is extended or adjusted under 35 U.S.C. 154(b) by 19 days.

(21) Appl. No.: 15/275,663

(22) Filed: Sep. 26, 2016

(65) Prior Publication Data
US 2017/0106411 A1    Apr. 20, 2017

(30) Foreign Application Priority Data
Oct. 14, 2015  (DE) .................. 10 2015 117 458

(51) Int. Cl.
*B08B 1/00*      (2006.01)
*B08B 1/04*      (2006.01)
(Continued)

(52) U.S. Cl.
CPC ............... *B08B 1/04* (2013.01); *B08B 1/002* (2013.01); *B08B 3/04* (2013.01); *B08B 3/08* (2013.01);
(Continued)

(58) Field of Classification Search
CPC ... B60S 3/042; A46B 2200/3046; B08B 1/00; B08B 1/04; B08B 1/002; B08B 3/04; F16F 15/324
See application file for complete search history.

(56) References Cited

U.S. PATENT DOCUMENTS 4,009,499 A * 3/1977 Casler ........................ B08B 1/04
                                                      15/88.3
4,106,964 A * 8/1978 DeVittorio ............ F16F 15/324
                                                      118/302
(Continued)

FOREIGN PATENT DOCUMENTS

DE         44 18 219 A1      11/1995
EP         0 684 464 B1      11/1995
WO        2009/012104 A1      1/2009

OTHER PUBLICATIONS

Machine translation: KR2009046394A; Park, H. S.; May 11, 2009.*
(Continued)

*Primary Examiner* — Mikhail Kornakov
*Assistant Examiner* — Natasha N Campbell
(74) *Attorney, Agent, or Firm* — Collard & Roe, P.C.

(57) ABSTRACT

In a method for cleaning a fastening surface (2) for a balancing element on an inner face (3) of a rim (4) of a vehicle wheel (5), the vehicle wheel (5) is positioned in a holding apparatus (13) such that a cleaning apparatus (9) can be moved, by means of a handling apparatus (6), to the fastening surface (2) on the inner face of the rim (4) of the positioned vehicle wheel (5). The cleaning apparatus (9) is arranged at a free end of the handling apparatus (6). The cleaning apparatus (9) is then moved by the handling apparatus (6) to a wetting device (15) filled with a cleaning agent (11) and is wetted with cleaning agent (11) in the wetting device (15). The cleaning apparatus (9) wetted with cleaning agent (11) is then moved by the handling apparatus (6) into the wheel rim (4), where it is moved such that the cleaning apparatus (9) cleans at least one fastening surface (2) on the inner face (3) of the wheel rim (4).

9 Claims, 2 Drawing Sheets

(51) Int. Cl.
*B08B 3/04* (2006.01)
*B08B 3/08* (2006.01)
*B60B 1/00* (2006.01)
*B60S 3/04* (2006.01)
*F16F 15/32* (2006.01)
*G01M 1/32* (2006.01)
*B60B 3/00* (2006.01)

(52) U.S. Cl.
CPC ................ *B60B 1/00* (2013.01); *B60S 3/042* (2013.01); *B60B 3/00* (2013.01); *F16F 15/324* (2013.01); *G01M 1/326* (2013.01)

(56) References Cited

U.S. PATENT DOCUMENTS

| | | |
|---|---|---|
| 7,325,268 B1 | 2/2008 | Curcuri |
| 2006/0273652 A1* | 12/2006 | Winch ................ F16F 15/328 301/5.21 |
| 2010/0147458 A1 | 6/2010 | Donnay et al. |
| 2017/0197595 A1* | 7/2017 | Kerwin ................ B60S 3/042 |

OTHER PUBLICATIONS

Abstract: KR2009046394A; Park, H. S.; May 11, 2009.*
European Search Report in EP 16192696.9-1703, dated Mar. 13, 2017, with English translation of relevant parts.

* cited by examiner

METHOD FOR CLEANING A FASTENING SURFACE FOR A BALANCING ELEMENT ON A VEHICLE WHEEL

CROSS REFERENCE TO RELATED APPLICATIONS

Applicants claim priority under 35 U.S.C. § 119 of German Patent Application No. 10 2015 117 458.8 filed Oct. 14, 2015.

FIELD OF THE INVENTION

The invention relates to a method for cleaning a fastening surface for a balancing element on an inner face of a wheel rim. The invention further relates to an apparatus for carrying out the method.

BACKGROUND OF THE INVENTION

Methods and apparatuses for attaching balancing elements to vehicle wheels are known. After the vehicle wheel has been fitted, the imbalance of the wheel is determined in an imbalance measuring apparatus. In order to compensate for the measured imbalance, at least one balancing element is attached to the inner face of the wheel rim in a balancing station. It is often necessary to attach a plurality of balancing elements in different balancing planes. The balancing element to be attached is generally separated from a material strip, coated with a fastening means, for example double-sided tape, and adhesively bonded to a pre-calculated position on the wheel rim inner face.

In order to ensure that the balancing element is permanently fastened, the surface to which the balancing element is to be fastened must be cleaned before said element is attached. Even small amounts of dirt can affect the adhesiveness of the fastening means.

It is known to manually clean the fastening surface before attaching the balancing element by wiping out the wheel rim inner face with a cleaning cloth. In addition, a volatile cleaning agent such as isopropanol or spirit can be used in order to improve the cleaning action.

However, a disadvantage of this is that reproducible cleaning of the wheel rims cannot be ensured and the amount of cleaning agent used can vary greatly. Moreover, the known type of cleaning cannot be integrated in a fully automated imbalance compensation process.

SUMMARY OF THE INVENTION

The invention therefore addresses the problem of providing automatable cleaning of a region of a wheel rim.

The problem is solved according to the invention in that a method is provided for cleaning a fastening surface for a balancing element on an inner face of a rim of a vehicle wheel, in which method the vehicle wheel is positioned in a holding apparatus such that a cleaning apparatus can be moved, by means of a handling apparatus, to the fastening surface on the inner face of the rim of the positioned vehicle wheel, wherein the cleaning apparatus is arranged at a free end of the handling apparatus and the cleaning apparatus is moved by the handling apparatus to a wetting device filled with a cleaning agent and is wetted with cleaning agent in the wetting device, and the cleaning apparatus wetted with cleaning agent is moved by the handling apparatus into the wheel rim, where it is moved such that the cleaning apparatus cleans at least one fastening surface on the inner face of the wheel rim. The method according to the invention is automatable and can be integrated into an assembly line. Moreover, the cleaning is reproducible and can take place using a predefined amount of cleaning agent. By means of the claimed cleaning of the fastening surface, a small amount of cleaning agent is used for the cleaning, and therefore it is also ensured that the cleaning agent substantially completely evaporates before the balancing element is attached. As a result, damage to the fastening means by the cleaning agent can be almost completely precluded.

In order to keep the amount of cleaning agent received by the cleaning apparatus as small as possible, it is proposed that an upper face of the cleaning apparatus is immersed in a wetting plate of the wetting device that comprises the cleaning agent. The immersion depth of the cleaning apparatus can be predefined and controlled, and varied according to the cleaning agent used, the shape of the cleaning apparatus and the number of fastening surfaces to be cleaned. The small insertion depth means that only a small amount of cleaning agent is received, the cleaning agent being distributed in the cleaning apparatus by the movement of the handling apparatus such that efficient cleaning of the fastening surface with the cleaning agent is ultimately ensured.

The method according to the invention combines mechanical cleaning with chemical cleaning, which leads to improved and more efficient cleaning. In addition, the mechanical cleaning can also be assisted by the cleaning apparatus rotatably cleaning the fastening surface. For this purpose, a drive can be provided in the housing of the handling apparatus, which drive is drivingly connected to the cleaning apparatus. A compressed-air motor or an electric motor can be used as the drive. The rotation of the cleaning apparatus can be controlled as a function of time, and therefore the cleaning of the fastening surface or the rotation of the cleaning apparatus takes place for a defined duration, after which the motor switches off.

The cleaning apparatus can be moved in the wheel rim in three spatial directions using the handling apparatus, the actual cleaning taking place in two spatial directions after the fastening surface has been approached, and therefore the cleaning apparatus is moved in particular laterally to the inner face of the wheel rim.

In a preferred embodiment, it is provided that, after a first fastening surface has been cleaned, the handling apparatus moves the cleaning apparatus to a second fastening surface to be cleaned. By inserting the cleaning apparatus just once into the interior space of the wheel rim, a plurality of fastening surfaces can be cleaned without the cleaning apparatus needing to be moved again to the wetting device between the cleaning operations. As a result, a plurality of fastening surfaces in a vehicle wheel can be cleaned in a short time and in one work step.

In another aspect, the invention relates to an apparatus for carrying out the method, comprising a holding apparatus which holds a vehicle wheel, and a handling apparatus which comprises a rotatable cleaning apparatus at its free end, wherein the wheel can be positioned in the holding apparatus such that at least one fastening surface to be cleaned on an inner face of a wheel rim is accessible to the cleaning apparatus which can be moved thereto by means of the handling apparatus and wherein a wetting device which comprises a cleaning agent is arranged in the working region of the handling apparatus. The apparatus according to the invention can be integrated into an assembly line as a cleaning station owing to the automatic cleaning of the fastening surface. Said cleaning station can be connected downstream of an imbalance measuring station and upstream of the balancing station, for example. Moreover, a plurality of fastening surfaces can also be cleaned in one work step. In particular by means of the combination of mechanical and chemical cleaning, quick and above all efficient cleaning of the fastening surface can be achieved, which makes it possible to securely and permanently fasten the balancing element.

In order to design the cleaning apparatus to be able to move in all three spatial directions, it is proposed that the handling apparatus is designed as an articulated arm that can be moved in three directions. As a result, it is also possible that the cleaning apparatus can be moved in three spatial directions in the interior of the wheel rim and the fastening surface is cleaned in two spatial directions.

Advantageously, the cleaning apparatus can be moved relative to the articulated arm of the handling apparatus about at least one axis. As a result, precise control of the cleaning apparatus in the wheel rim is possible. In addition, the freedom of movement of the cleaning apparatus relative to the articulated arm is improved.

The cleaning apparatus can be advantageously set in rotation by a motor arranged on the handling apparatus. The motor can be accommodated in the housing of the handling apparatus.

The handling apparatus can be controlled in various ways. For example, it can be advantageous for a sensor for detecting markings on the wheel to be arranged on the handling apparatus. A fastening surface to which a balancing element is to be attached can be pre-marked, and can be detected by the sensor of the handling apparatus and used for controlling the handling apparatus. For example, the fastening surface having a mark made using a magnetic dipole in the imbalance measuring station is detected by means of a magnetic field sensor present on the handling apparatus. The movements of the handling apparatus can be controlled using a programmable servo control, for example a computer numerical control, such that the intended application of the relevant device of the handling apparatus can easily be carried out by inputting application-specific data and programs. The control device of the handling apparatus can obtain the position of the fastening surface to be cleaned from the imbalance measuring station and accordingly control the handling apparatus.

It is also proposed that the wetting device includes a wetting plate that comprises the cleaning agent, the diameter of which is adapted to the diameter of the cleaning apparatus such that an upper face of the cleaning apparatus can be placed completely into the wetting plate. In addition, the depth of the wetting plate can be adapted such that only a defined region of the cleaning apparatus is immersed in the wetting plate. Of course, it is also possible to control the insertion depth by means of the control device of the handling apparatus.

BRIEF DESCRIPTION OF THE DRAWING

An embodiment of the present invention is illustrated in the accompanying drawing and will be described in greater detail in the following. In the drawing.

DETAILED DESCRIPTION OF THE DRAWINGS

Figure 1:
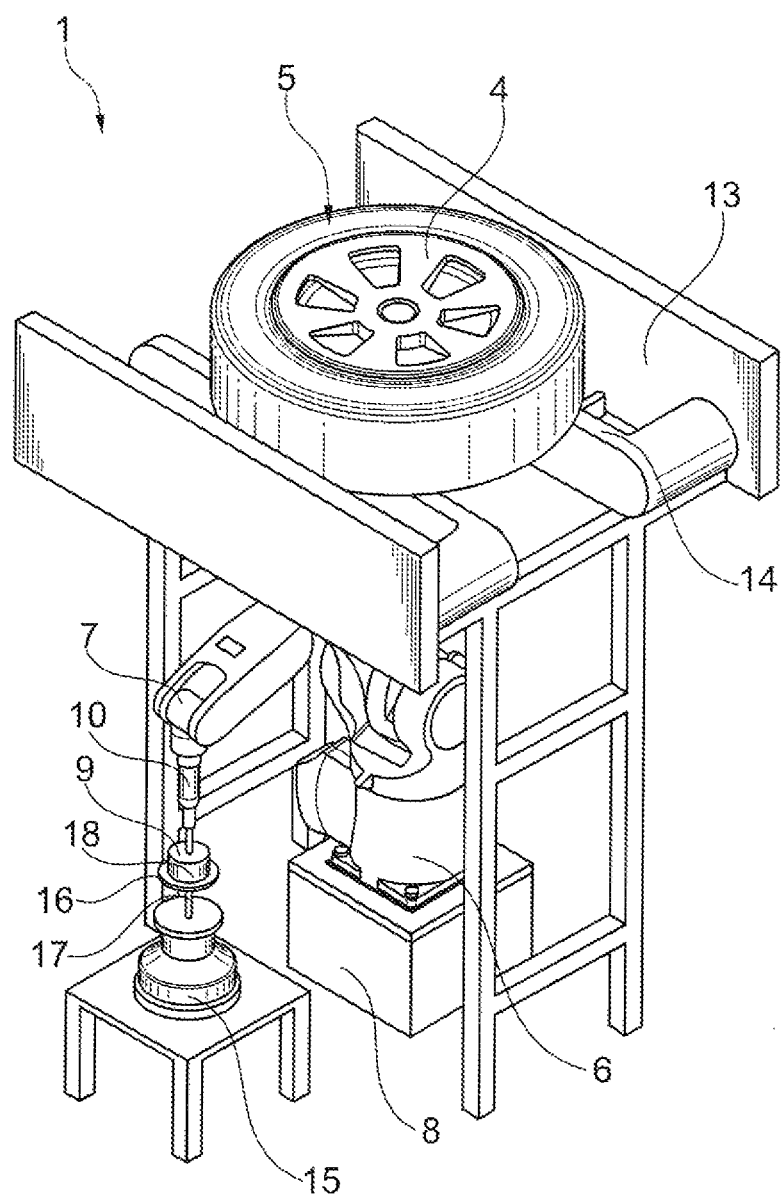
FIG. 1 is a perspective view of a preferred apparatus having a cleaning apparatus on the wetting device.
Figure 2:
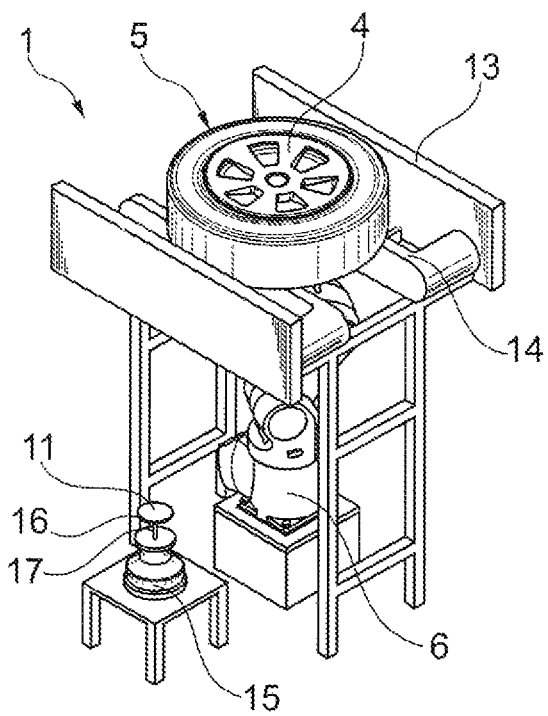
FIG. 2 is a perspective view of the preferred apparatus having the cleaning apparatus in a wheel rim and FIG. 3 is a side view of the apparatus according to FIG. 2, in partial cross section.
Figure 3:
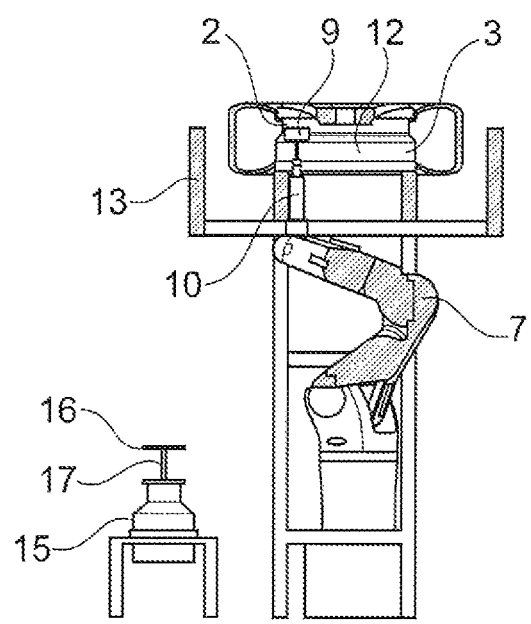

An apparatus 1 for cleaning a fastening surface 2 for a balancing element on an inner face 3 of a rim 4 of a wheel 5 is shown which can be used for a method as previously described. The handling apparatus 6 is an industrial robot, comprising an articulated arm 7 that has a plurality of movement axes, by means of which arm the handling apparatus 6 can be moved in three spatial directions. The articulated arm 7 comprises a plurality of joints. The handling apparatus 6 can be stationarily positioned on a stand 8. However, movable positioning of the handling apparatus 6 is also possible in which the handling apparatus 6 is arranged on a stand that can be slid on rails.

At its free end, the handling apparatus 6 comprises a cleaning apparatus 9, which is designed as a brush and is rotatably connected to a drive shaft of a motor 10. The cleaning apparatus 9 is cylindrical and has a diameter that is adapted to the curve of the wheel rim inner face 3. The cleaning apparatus 9 can be drivingly connected to the motor 10 via a plug connection or snap connection, for example, and can be easily replaced. The cleaning apparatus 9 can thus be simply adapted to different surfaces to be cleaned. A hydrophilic plastics material is suitable as the material for the cleaning apparatus 9, which material absorbs a cleaning agent 11 well and does not damage the surface of the wheel rim 4.

The cleaning apparatus 9 is driven and set in rotation by the motor 10 arranged in the housing of the handling apparatus 6. The motor 10 can be a compressed-air motor, for example, which drives the cleaning apparatus 9 in a powerful manner and is insensitive to the cleaning agent 11 used. In particular, a compressed-air vane motor or a gear motor are options for the compressed-air motor. Of course, the cleaning apparatus 9 can also be driven by means of an electric motor.

In order to precisely control the handling apparatus 6, a plurality of independent drives can be used which can be controlled by a programmable control device and make it possible to move the handling apparatus 6 in a precisely positioned manner. Moreover, the cleaning apparatus 9 can be moved relative to the articulated arm 7 of the handling apparatus 6 about at least one axis. As a result, precise movement of the cleaning apparatus 9 in the wheel rim 4 or in an inner rim 12 of the wheel nm 4 is sometimes possible.

A holding apparatus 13 is arranged in the working region of the handling apparatus 6, which holding apparatus facilitates the feeding and positioning of fitted vehicle wheels 5 for which a determined imbalance is to be balanced. The holding apparatus 13 comprises a transport apparatus 14 as shown in the drawings, by means of which the vehicle wheel 5 can be conveyed into a position above the handling apparatus 6. In the process, the vehicle wheel 5 is positioned on the transport apparatus 14 or on the holding apparatus 13 in such a way that the wheel rim 4 is oriented towards the handling apparatus 6 and is accessible to said handling apparatus. The holding apparatus 13 can also be aligned in a different orientation to the handling apparatus 6 than that shown in the drawings, it only being crucial that the wheel rim 4, in particular the wheel rim inner face 3 of the wheel rim 4, is accessible to the handling apparatus 6 and that the cleaning apparatus 9 can be moved into said wheel rim.

In addition a wetting device 15 is located in the working region of the handling apparatus 6. The wetting device 15 comprises a trough designed as the wetting plate 16. Liquid, cleaning agent 11 is conveyed via a supply line 17 in the centre of the wetting plate 16 into the wetting plate 16 by means of a pump arranged beneath the wetting plate 16. The cleaning agent 11 can be isopropanol or spirit, for example. In this respect, it can be advantageous if the cleaning agent 11 comprises an adhesion promoter which assists the subsequent attachment of the balancing element by means of the fastening means. The adhesion promoter can be mixed with the cleaning agent 11 in liquid or solid form, the volatile cleaning agent 11 evaporating after the fastening surface 4 has been cleaned and only the adhesion promoter remaining on the fastening surface 4.

After the vehicle wheel 5 has been fitted, the imbalance of the wheel 5 is measured in an imbalance measuring station. The apparatus 1 according to the invention can be a component of an assembly line as a cleaning station. Before one or more balancing elements are fastened to the wheel 5 for balancing the imbalance, the relevant fastening surface 2 is cleaned. For this purpose, the vehicle wheel 5 is conveyed from the imbalance measuring station to the holding apparatus 13 by the transport apparatus 14, for example a conveyor belt. A sensor in the form of a photoelectric sensor detects when the wheel 5 enters the holding apparatus 13. Using a servomotor, the wheel 5 is positioned in the holding apparatus 13 such that the interior of the wheel rim 4 is accessible to the cleaning apparatus 9 and the cleaning apparatus 9 can clean one or more regions of the wheel rim inner face 3.

While the wheel 5 is being positioned, the cleaning apparatus 9 can be moved from the handling apparatus 6 to the, wetting device 15. An upper face 18 of the cleaning apparatus 9 is moved into the wetting plate 16 such that at least one region of the cleaning apparatus 9 is brought into contact with the cleaning agent 11. The cleaning apparatus 9 is then moved by the articulated arm 7 of the handling apparatus 6 and rotated by 180°, for example, as a result of which the cleaning agent 11 is distributed in the cleaning apparatus 9.

The handling apparatus 6 now moves the cleaning apparatus 9 towards the wheel rim 4 or the inner rim 12 and into said rim until it reaches the fastening surface 2 to which a balancing element is to be adhered in the subsequent balancing station. The vehicle wheel 5 arranged in the holding apparatus 13 is brought into a defined position by the servomotor of the holding apparatus 13, the handling apparatus 6 being moved by the control device to the fastening surfaces 2 to be cleaned. The exact position of the fastening surface 2 is previously determined in the imbalance measuring station and can thus be subsequently used to control the handling apparatus 6. The cleaning apparatus 9 is moved from below into the interior of the wheel rim 4 and to the fastening surface 2. The cleaning apparatus 9 can be set in rotation by the motor 10. The cleaning apparatus 9 is oriented tangentially to the wheel rim inner face 3. In order to clean the fastening surface 2 over a large surface area, the cleaning apparatus 9 can be moved laterally to the wheel rim inner face 3 by the handling apparatus 6, a two-dimensional movement of the cleaning apparatus 9 being possible during the actual cleaning, which movement is also achieved by the cleaning apparatus 9 being movable relative to the articulated arm 7 of the handling apparatus 6 about at least one axis.

The fastening surface 2 can be efficiently cleaned by the cleaning apparatus 9. The cleaning is done mechanically by means of the rotation of the cleaning apparatus 9 and chemically by means of the cleaning agent 11. The fact that a volatile cleaning agent 11 is used means that the cleaning agent 11 evaporates rapidly and does not have a negative effect on the process of fastening the balancing element.

If a second balancing element is to be attached to the wheel, the cleaning apparatus 9 can be moved by the handling apparatus 6 to another fastening surface 2 directly after the cleaning of a first fastening surface 2 has finished, without the cleaning apparatus 9 needing to be re-wetted with cleaning agent 11 in between. As a result, a plurality of fastening surfaces 2 can be cleaned in one work step, which saves a considerable amount of time.

What is claimed is:

1. Method for cleaning a fastening surface for a balancing element on an inner face of a rim of a vehicle wheel, in which method the vehicle wheel is positioned in a holding apparatus such that a cleaning apparatus can be moved, via a handling apparatus, to the fastening surface on the inner face of the rim of the positioned vehicle wheel,
   wherein the cleaning apparatus is arranged at a free end of the handling apparatus and comprises a brush that is rotatably connected to a drive shaft of a motor,
   wherein the brush is moved by the handling apparatus to a wetting device filled with a cleaning agent,
   wherein an upper face of the brush is moved into a wetting plate of the wetting device such that at least one region of the brush is brought into contact with the cleaning agent,
   wherein the brush is then rotated by 180° so that the cleaning agent is distributed in the brush,
   wherein the brush wetted with cleaning agent is moved by the handling apparatus into the wheel rim, the brush being moved from below into the interior of the wheel rim and to at least one fastening surface,
   wherein the brush is set in rotation around its axis by the motor, and
   wherein the brush cleans the at least one fastening surface on the inner face of the wheel rim rotatably.

2. Method according to claim 1, wherein an upper face of the brush is immersed in the wetting plate of the wetting device.

3. Method according to claim 1, wherein the brush is moved laterally to the inner face of the wheel rim.

4. Method according to claim 1, wherein, after a first fastening surface has been cleaned, the handling apparatus moves the brush to a second fastening surface to be cleaned.

5. Apparatus for carrying out the method according to claim 1, comprising a holding apparatus which holds a vehicle wheel, and a handling apparatus which comprises a rotatable cleaning apparatus at its free end, the rotatable cleaning apparatus comprising a brush, the brush being rotatably connected to a drive shaft of a motor via a plug connection or a snap connection, wherein the brush is set in rotation around its axis by the motor,
   wherein the wheel can be positioned in the holding apparatus such that at least one fastening surface to be cleaned on an inner face of a rim of the vehicle wheel is accessible to the brush which can be moved thereto via the handling apparatus, wherein a wetting device which comprises a cleaning agent is arranged in the working region of the handling apparatus,
   wherein the wetting device includes a wetting plate that comprises the cleaning agent and a wetting plate diameter, the wetting plate diameter being adapted to a diameter of the brush such that an upper face of the brush can be placed completely into the wetting plate, and
   wherein the wetting device further comprises a pump and a supply line, the pump being arranged beneath the wetting plate and being configured to pump the cleaning agent upwards through the supply line to the wetting plate.

6. Apparatus according to claim 5, wherein the handling apparatus is designed as an articulated arm that can be moved in three directions.

7. Apparatus according to claim 6, wherein the brush is movable relative to the articulated arm of the handling apparatus about at least one axis.

8. Apparatus according to claim 5, wherein the motor is arranged on the handling apparatus.

9. Apparatus according to claim 5, wherein a sensor for detecting markings on the wheel is arranged on the handling apparatus.

* * * * *